J. B. BAIN.
AUTOMATIC PUSH BUTTON RECORDING SCALE.
APPLICATION FILED MAY 12, 1915.

1,291,363.

Patented Jan. 14, 1919.
4 SHEETS—SHEET 1.

Inventor
J. B. Bain

By T. R. L. Bryant,
Attorney.

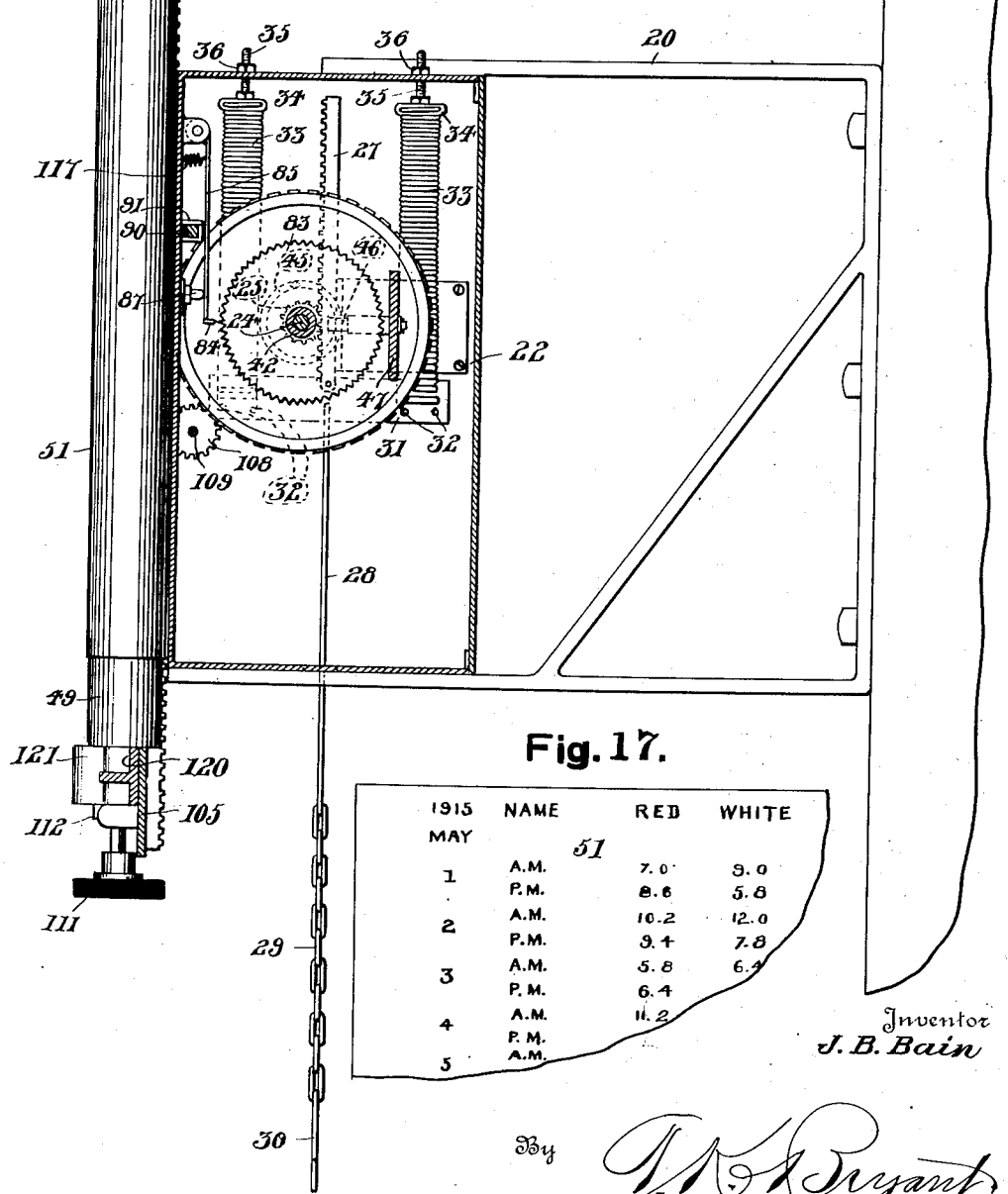

J. B. BAIN.
AUTOMATIC PUSH BUTTON RECORDING SCALE.
APPLICATION FILED MAY 12, 1915.
1,291,363.
Patented Jan. 14, 1919.
4 SHEETS—SHEET 3.
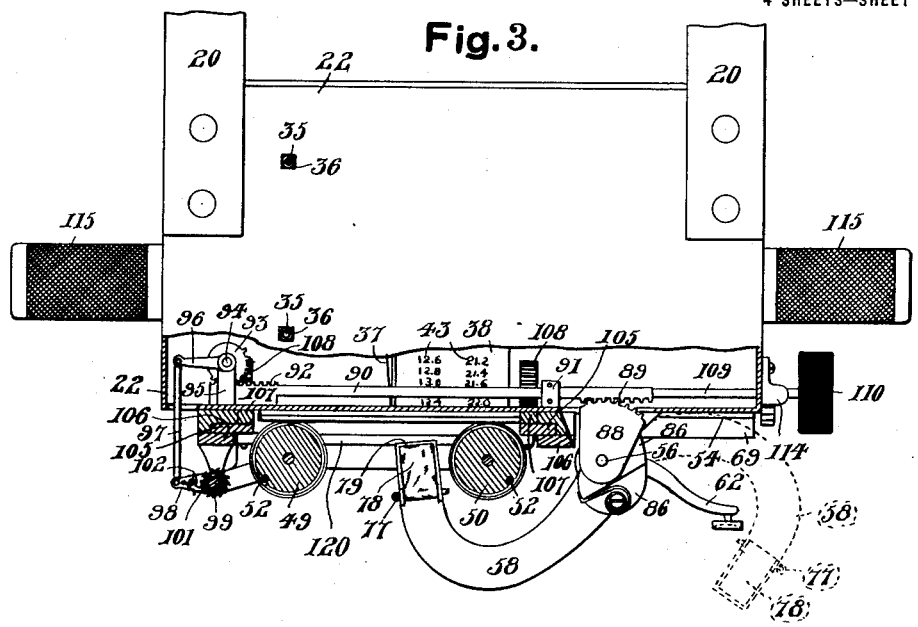
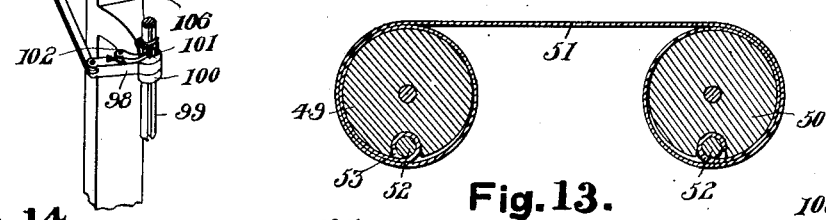
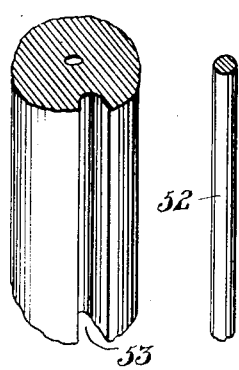
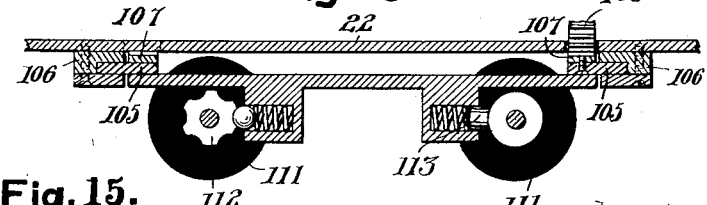
Inventor
J. B. Bain

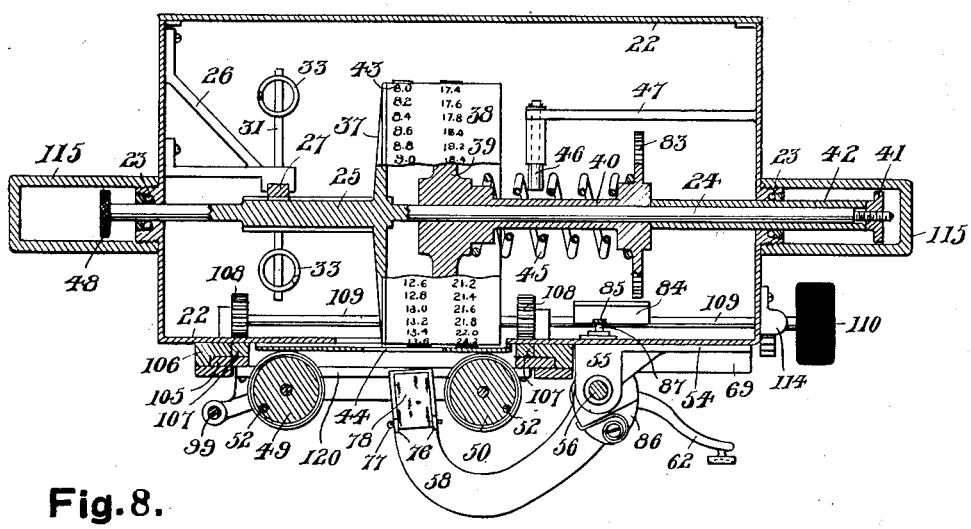
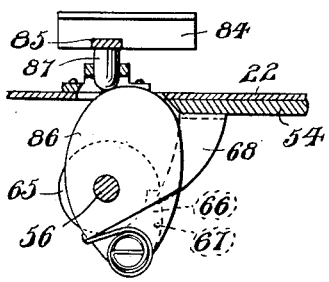
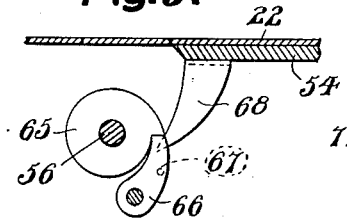
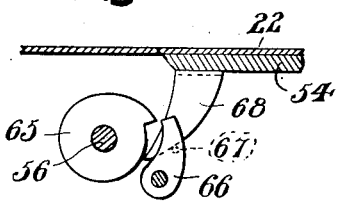
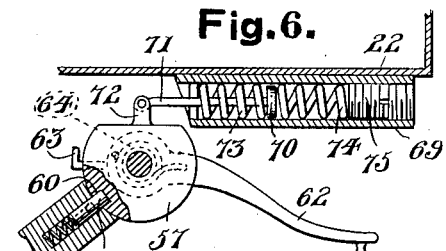
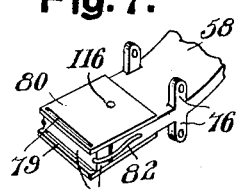
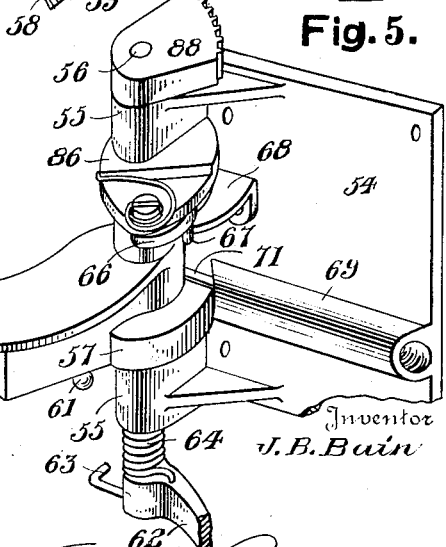

UNITED STATES PATENT OFFICE.

JESSE B. BAIN, OF KENNEDY, NEW YORK.

AUTOMATIC PUSH-BUTTON RECORDING-SCALE.

1,291,363.  Specification of Letters Patent.  Patented Jan. 14, 1919.

Application filed May 12, 1915. Serial No. 27,578.

*To all whom it may concern:*

Be it known that I, JESSE B. BAIN, a citizen of the United States of America, residing at Kennedy, in the county of Chautauqua and State of New York, have invented certain new and useful Improvements in Automatic Push-Button Recording-Scales, of which the following is a specification.

This invention relates to automatic push button recording scales serviceable in any store or dairy, but has special reference to a device arranged to weigh and record the amount of milk furnished by a number of different cows, the weights being recorded for each milking of the cows.

Heretofore, in devices of such character as this, it has been impossible for the operator to constantly observe the product of each cow as the recorded numbers have been concealed.

One object of the invention, accordingly, is to provide a device of this character wherein the recorded numbers will be at all times visible, and such numbers also upon the type are directly readable, while the impressions from the type are obtained through rather than upon the paper.

In devices of this character, it is desirable that the pail or other receptacle which is employed to weigh the milk received, should not indicate its weight in connection with the weight of the milk. In other words, it is desirable that no matter what the weight of the receptacle may be, the scales should be at zero when the milk is inserted in the receptacle.

A second object of the invention, accordingly, is to provide a device of this character wherein the tare, due to the weighing of the receptacle, may be eliminated by means of readily setting the scale to zero after the receptacle is attached thereto.

It is also important in this class of devices to provide, in a compact form, a large series of indices for the different weights.

A third object of the invention, accordingly, is to provide an improved construction of such devices which will permit of the using of a long series of numbers, indicative of different weights, while maintaining a compact arrangement of the parts.

This type of device should also have means for shifting the paper or other surface upon which the record is made automatically after each weighing so that the milk from successive cows can be weighed without requiring manual manipulation of the shifting means.

A fourth object of the invention is therefore, to provide such automatic shifting means.

It is also necessary in these devices to keep the record for a series of days, such as one month, and to this end, a fifth object of the invention is to provide means for shifting the record strip or blank after each milking.

Devices of this kind are frequently used with rotary wheels carrying the weight indices. In the utilization of such devices, it is important that the weight indices be centered with respect to the center of the index pointer, opening or the like, and which may be termed a weight index.

A sixth object of the invention is the provision of means whereby, prior to any impression of the numerals on a wheel of this class, the particular numeral indicating the weight may be accurately centered with respect to the weight index.

With the above and other objects in view as will be hereinafter apparent, the invention consists in general of certain novel details of construction and combinations of parts hereinafter fully described, illustrated in the accompanying drawings, and set forth in the appended claims.

In the accompanying drawings, like characters of reference indicate like parts in the several views, and:—

Fig. 2 is a vertical median section taken perpendicularly to Fig. 1.

Fig. 3 is a section on the line III—III of Fig. 1 but partly in elevation.

Fig. 4 is a section, partly in elevation, on the line IV—IV of Fig. 1.

Fig. 5 is a detail perspective view of the striker or printing mechanism.

Fig. 6 is a detail section on the line VI—VI of Fig. 1.

Fig. 7 is a detail perspective view showing the end of the striker arm with the pivoted platen attached thereto, but with the ribbon removed.

Fig. 8 is a detail section on the line VIII—VIII of Fig. 1.

Fig. 9 is a detail showing a portion of the striker mechanism embodying an automatically releasing pawl and stop device in engaged position.

Fig. 10 is a view similar to Fig. 9 showing the pawl and stop in disengaged position.

Fig. 11 is a detail perspective view of a portion of the feed mechanism which operates to shift the record sheet automatically after each weighing.

Fig. 12 is a detail section through the sheet-carrying rolls showing the manner of securing the sheet thereto.

Fig. 13 is a detail section on the line XIII—XIII of Fig. 1, certain parts to the rear of the plane of this section being also shown in section, better to disclose certain of the operating means.

Fig. 14 is a detail perspective of a portion of one of the sheet-carrying rolls.

Fig. 15 is a detail of a portion of one of the sheet locking rods.

Fig. 17 is a front view of a portion of a record sheet employed with the device.

Figures 1, 16:
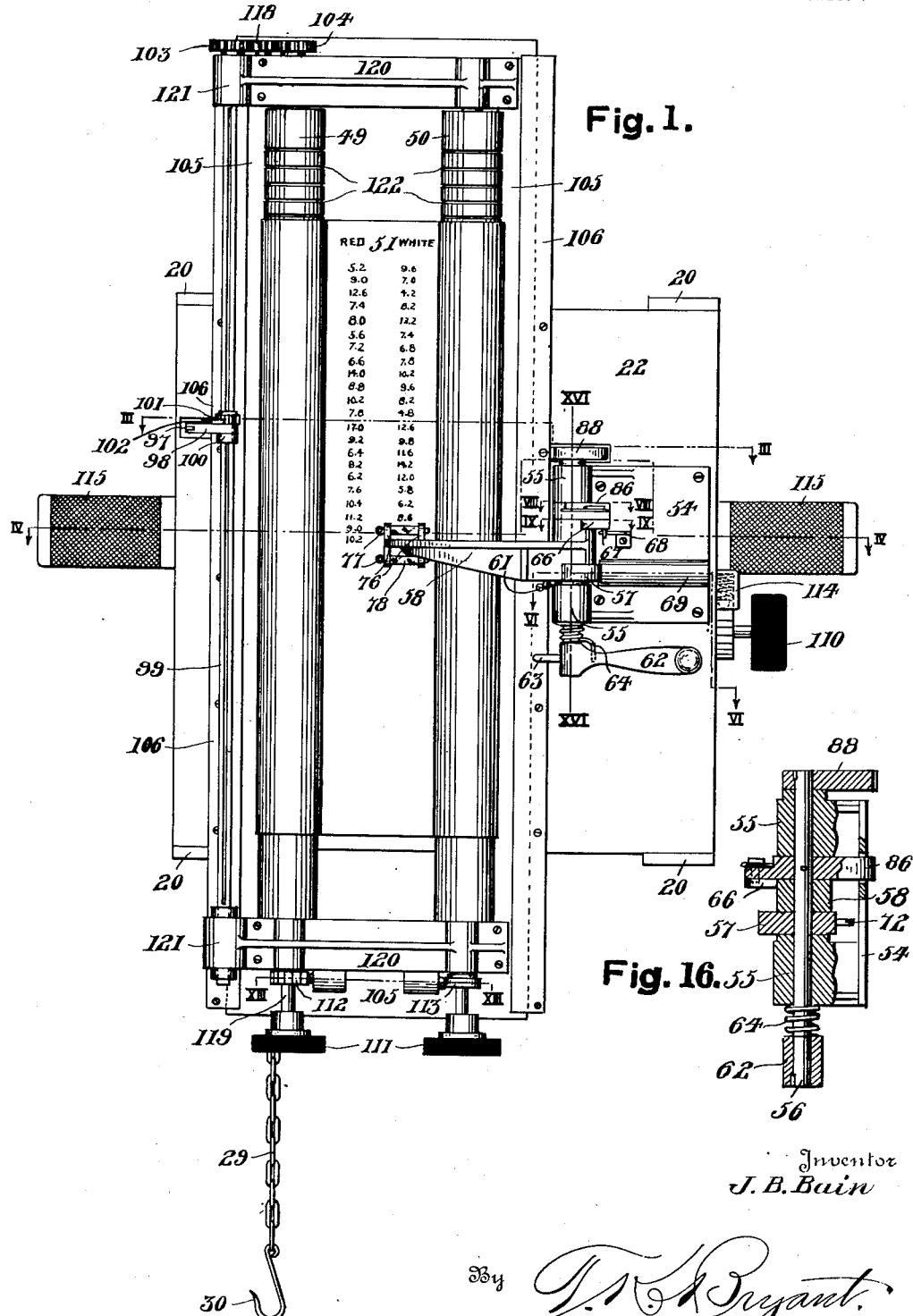
Figure 1 is a front elevation of the device.
Fig. 16 is a detail sectional view upon line XVI—XVI of Fig. 1.

In carrying out this invention, there is provided a frame 20 which is adapted for attachment to a wall or post as indicated at 21. This frame 20 supports a casing 22 which contains the main working parts of the scale. Journaled in suitable ball bearings 23 through this casing is a shaft 24 which is provided at one side of the casing with an elongated pinion portion 25. Supported within the casing is a guide 26 wherein slides a rack 27 meshing with the pinion 25 and having connected to its lower end a rod 28 which extends through a suitable opening in the bottom of the casing and terminates in a chain 29 provided with a hook 30 of such formation as to accommodate the handle of a milk pail or the like. Secured to the lower end of this rack 27 is a yoke member 31 which is provided at each end with a series of spaced openings 32 so that the ends of spiral springs 33 may be screwed therein, the upper ends of said springs being secured by any suitable means, such as the clips 34 to adjusting bolts 35 which pass through the top of the casing and are adjusted by means of nuts 36. By these means the springs may be regulated as to tension, being either screwed more or less through the sets of openings 32 or drawn upon by the action of the nuts 36, or both means may be employed to regulate the tension and insure accurate weighing.

At the end of the pinion 25 is a friction disk 37 adapted for engagement by the periphery of a drum 38 carried on a spider 39 formed on a sleeve 40, slidably and revolubly mounted on the shaft 24, the sleeve and drum being forced toward the disk 37 by an adjusting nut 41 screwed on the shaft 24 and bearing against a loose sleeve 42 interposed between the nut and the end of the sleeve 40.

On the drum 38 is a series of numbers 43 arranged in a directly readable spiral form and adapted to be exposed through an opening 44 in the front of the casing, the members indicating varying weights and being referred to as weight indices while the opening 44 forms the weight index or pointer. By the spiral arrangement referred to, a smaller diameter of drum is possible for a given number of weight indices than where the indices are arranged in a circumferential series. In order to cause the different portions of the spiral series to appear opposite the same part of the opening 44 as the drum revolves, there is provided a spiral cam upon the said sleeve 40 in the form of a coil of strong and stiff wire 45 between the coils of which extends a roller finger 46 supported on an arm 47 fixed to the casing of the device.

It will be seen that if a pail is hung on the hook 30, the weight of the pail will tend to cause rotation of the shaft 24 as the rack 27 will act upon the pinion 25 whereby to effect such rotation. This will be received by the springs 33, the springs yielding in proportion to the amount of weight suspended on the hook 30. If the drum be clamped to the plate 37 by the nut 41, the drum will rotate with the shaft. However, as the weight of the pail is not to be included with the milk, the end nut 41 is relaxed and the shaft held stationary by means of the knurled head 48 upon the opposite end of the shaft 24, while the drum 38 is rotated by means of the rod 28 until the zero point is brought opposite the center of the opening 44. When this is accomplished, the drum is locked to the shaft through the medium of the nut 41 so that after this operation the weight of the milk poured into the pail will be indicated without indicating any weight of the pail. It is furthermore to be noted that the roller pin 46 is of less diameter than the distance between the coils of the cam 45, being considerably less than tolerance, so that a certain amount of free rotative movement of the drum 38 may be obtained without friction resulting from contact of the roller pin 46 with the spiral cam 45 and without any consequent horizontal motion, and rendering the device more accurate. Removable cover caps 115 are provided for the head 48 and nut 41.

It will be seen from the foregoing description that an improved construction of weighing device which is of delicate nature has been obtained and the recording of the weights obtained by the foregoing weighing device is performed by the means hereinafter set forth.

Upon the front of the casing are journaled the rollers 49 and 50, the roller 49 constituting the winding or feed roller while the roller 50 constitutes a receiving and dispensing roller. Around the roller 50 is wrapped a sheet 51, the sheet 51 being also secured to the roller 49. In order to secure these sheets to the rollers, rods 52 are hinged at one end within grooves 53 in the rollers and the ends of the sheet are wrapped around these rods and the rods forced into the grooves as best seen in Fig. 12. This sheet covers the opening 44 and the indices 43, which indices are in the form of raised directly readable type faces, lying immediately under the sheet. That is, the type may be read frontward when the paper is removed, the type not being backwardly readable as in the ordinary position of printers' type. Annular grooves 122 are provided in the rollers 49 and 50 for guidingly assisting the operator in accurately placing the sheet 51 upon the rollers. On the front of the casing is a bracket 54 provided with ears 55 wherein is journaled a shaft 56 having a disk 57 journaled thereon. Revolubly mounted on the shaft 56 is an arm 58 carrying a spring-pressed pin 59, the end of which is adapted to engage in a recess 60 in the periphery of the disk 57 when the arm is in one position relative to said disk. Attached to the pin 59 is a thumb piece 61 by means of which the pin may be withdrawn from the recess to permit the arm to turn freely on the shaft 56 inoperatively, as shown by dotted lines in Fig. 3. At 62 is a push button lever which is fixed to the shaft 56 and is provided with a stop piece 63 adapted to engage a fixed part of the casing to limit movement of the lever in one direction. The shaft 56 is surrounded by a spring 64 connected at one end to the lever 62 and at the other end to one of the ears 55 so that the lever is constantly urged in an outward direction from the casing. On the shaft 56 is a single toothed ratchet or stop 65 secured to turn with the arm 57 which engages a pawl 66 pivoted to a cam 86 secured to said shaft and provided with a pin 67 arranged, when the lever 62 is depressed, to engage a fixed cam 68 and thereby effect a release of the said pawl from the stop 65 as clearly indicated in Figs. 9 and 10. Carried by the bracket 54 is a cylinder 69 wherein works a plunger 70 having link connection 71 pivotally with an arm 72 extending from the disk 57. This cylinder 69 also contains a spring 73 arranged to operate against the plunger and force the same in such direction as to cause the arm 58 to strike at its free end against the record sheet. A buffer spring 74 is also held in the cylinder in opposition to the spring 73, the tension of the buffer spring being regulated by an adjusting screw 75 by means of which the tension may be varied in such manner as to constantly hold the arm 58 out of contact with the sheet so that the recorded numbers may be observed.

Adjacent the free end of the arm 58 are the roll-carrying ears 76 which support suitable ribbon rollers or pins 77 carrying an ordinary typewriter ribbon 78 led through slots 79 in plates 80 pivotally connected as at 116 to the arm 58 and supporting a removable platen 81 held on the arm by springs 82, the plates projecting slightly beyond the platen so that when the end of the arm with the ribbon thereon strikes against the paper of the record sheet, the latter will be tensioned over the displayed figure, and the force of the blow will be equalized upon the number being printed.

In order to obtain an exact centering of the figure to be printed, there is provided on the sleeve 40 a gear 83 which is engaged by a centering tooth 84 carried on a spring-controlled arm 85, the spring 117 normally holding the tooth out of engagement with the gear and the latter being only forced into engagement when the lever 62 is depressed and causes the cam 86 to depress a slidable pin 87 mounted in a suitable bearing on the casing and arranged to press against the arm 85 when the device is operated. By this means as the tooth 84 engages between two of the teeth of the gear 83, the gear is accurately centered. The number of teeth on the gear, and consequently the spaces therebetween, equals the number of indices in one convolution of the spiral on the drum 38 so that the centering is properly effected.

In order to make provision for registering the milk received from different cows and causing the record sheet to move for successive weighings, there is provided on the shaft 56 a segmental gear 88 which meshes with a rack 89 formed on a bar 90 sliding in the guide 91, the opposite end of the bar being also provided with a rack 92 meshing with a segmental gear 93 fixed to a shaft 94. This shaft 94 is supported in bearings 95 and has fixed thereon a rock arm 96 connected by a link 97 with a rock arm 98 revolubly mounted on a shaft 99. This latter rock arm is slidable on the shaft 99 so that the shaft may slide through the rock arm and the shaft is mounted in a bearing 100, the rock arm 98 being located between this bearing and a ratchet wheel 101 splined on the shaft and engageable by the spring-pressed pawl 102, the connection of the parts being such that as the key or lever 62 is depressed, the pawl freely moves over the wheel 101, while when the key is released, after the arm 58 is operated, the pawl 102 engages the ratchet wheel 101 and rotates the shaft 99 upon the recoiling return movement of the lever 62. This shaft 99 carries at one end a gear 103 which meshes with an idler 118 in mesh with a gear 104 fixed on the shaft 119 of the roller 49. Thus, whenever the lever 62 is operated, the arm 58 strikes against the paper and prints the number indicating the net weight suspended from the hook 30 and immediately rebounds. Then, when the lever 62 is released, the pawl and ratchet mechanism 101 and 102 operates to move the paper while the arm 58 is then positioned one space removed therefrom, allowing free visual access to the record readings, while a new portion of the paper is positioned to secure the record of the next weight.

The rollers 49 and 50 are journaled in trunnion brackets 120 mounted at the opposite ends of a suitable frame 105 movable vertically in the guides 106 and the frame is provided with racks 107 engageable by gears 108 fixed on a shaft 109 provided with a finger piece or grip 110. The shaft 99 is also journaled in end bearings 121 carried by the brackets 120 in addition to the mounting bearing 100 heretofore referred to. These rollers themselves are also provided with finger pieces or grips 111 and the roller 49 is in addition, provided with a ball and ratchet device 112, while the roller 50 is provided with a spring friction device 113 so that the record sheet is at all times kept taut, these devices being best shown in Fig. 13. In like manner, the shaft 109 is provided with a spring-pressed ball ratchet device 114.

In operation, the record sheet is divided into a number of columns, the width of the columns corresponding to the amount that the sheet will be moved by each successive impulse effected by the pawl and ratchet mechanism controlling the roller 49. The sheet may be also divided if desired into sixty-two horizontal lines representing the morning and evening milkings for the thirty-one days of a month. The name, or other indication of each cow is written at the head of an individual column, one form of sheet being illustrated in Fig. 17. The finger piece 110 is manipulated to bring the morning or evening space under the platen for the given day of the month. For instance, if the apparatus is brought into use on the first of the month, the finger piece 110 is turned until the frame 105 supporting the rollers 49 and 50 is brought to such a position that the top numeral shown in Fig. 1 would be immediately below the platen. The vessel in which the milk is to be weighed is then suspended from the hook 30 and the scales adjusted as previously described. The milk from the first cow is then poured into this vessel, which causes rotation of the drum. The lever 62 is depressed and the figures indicating the amount of milk weighed, are printed on the face of the sheet 51. The arm 58 bounces back so that these figures are at once visible. The lever 62 is then released, whereupon a portion of the paper is wound on the roller 49 so that the column which is intended to receive the record of the weight of milk of the next cow is brought beneath the platen. The milk from the first cow is emptied from the vessel and that from the next cow poured therein. This operation is continued until all recordings for that particular time are completed. When the next milking time arrives, the finger-piece 110 is manipulated to raise the frame, and consequently the record sheet one space. Upon releasing the pawl 102, the finger-piece 111 of the roller 50 is grasped and the paper wound back on the roller 50. After this, the same operation is gone through as before.

It is to be noted particularly that the arrangement by means of which the printing characters are located behind the record sheet and the ribbon-carrying platen in front of the record sheet causes the printed characters to be struck through the record sheet and appear on the side opposite the type. Furthermore, this particular arrangement removes the necessity of forming the type backward as is common in devices of this character and in other printing devices, the type in the present instance being formed in their proper positions as they appear on the face of the paper.

It is obvious that many minor changes may be made in the form and construction of this invention without departing from the material principles thereof. It is not therefore desired, to confine the invention to the exact form shown and described, but it is wished to include all such as properly come within the scope claimed.

What I claim as new is:—

1. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, and means to operate the platen.

2. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a spring constantly urging the platen toward the type-carrying means, a lever mechanism releasably connected to the platen to move the same against action of the spring, and a trip device arranged to free the platen from the lever mechanism after the platen has been moved to a predetermined extent.

3. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a spring constantly urging the platen toward the type-carrying means, a lever mechanism releasably connected to the platen to move the same against action of the spring, a trip device arranged to free the platen from the lever mechanism after the platen has been moved to a predetermined extent, and a spring opposed to the first-mentioned spring and arranged to cause rebounding of the platen after forcing the record sheet against the type-carrying means.

4. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device on the platen, and means to operate the platen.

5. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device on the platen, a spring constantly urging the platen toward the type-carrying means, a lever mechanism releasably connected to the platen to move the same against action of the spring, and a trip device arranged to free the platen from the lever mechanism after the platen has been moved to a predetermined extent.

6. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device on the platen, a spring constantly urging the platen toward the type-carrying means, a lever mechanism releasably connected to the platen to move the same against action of the spring, a trip device arranged to free the platen from the lever mechanism after the platen has been moved to a predetermined extent, and a spring opposed to the first-mentioned spring and arranged to cause rebounding of the platen after forcing the record sheet against the type-carrying means.

7. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device carried by the platen and provided with means to tension the record sheet on the type-carrying means, and means to operate the platen.

8. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device carried by the platen and provided with means to tension the record sheet on the type-carrying means, a spring constantly urging the platen toward the type-carrying means, a lever mechanism releasably connected to the platen to move the same against action of the spring, and a trip device arranged to free the platen from the lever mechanism after the platen has been moved to a predetermined extent.

9. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device carried by the platen and provided with means to tension the record sheet on the type-carrying means, a spring constantly urging the platen toward the type-carrying means, a lever mechanism releasably connected to the platen to move the same against action of the spring, a trip device arranged to free the platen from the lever mechanism after the platen has been moved to a pre-determined extent, and a spring opposed to the first-mentioned spring and arranged to cause rebounding of the platen after forcing the record sheet against the type-carrying means.

10. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, means to operate the platen, and means operated by the platen operating means to effect centering of a type relative to the platen.

11. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a spring constantly urging the platen toward the type-carrying means, a lever mechanism releasably connected to the platen to move the same against action of the spring, a trip device arranged to free the platen from the lever mechanism after the platen has been moved to a predetermined extent, and means operated by the lever mechanism to effect centering of a type relative to the platen prior to operation of the trip device.

12. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a spring constantly urging the platen toward the type-carrying means, a lever mechanism releasably connected to the platen to move the same against action of the spring, a trip device arranged to free the platen from the lever mechanism after the platen has been moved to a predetermined extent, a spring opposed to the first-mentioned spring and arranged to cause rebounding of the platen after forcing the record sheet against the type-carrying means, and means operated by the lever mechanism to effect centering of a type relative to the platen prior to operation of the trip device.

13. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the same longitudinally and laterally before the drum, a platen movable to and from the drum whereby to force the record sheet against the type, a printing ribbon supporting device on the platen, means to operate the platen, and means operated by the platen operating means to effect centering of a type relative to the platen.

14. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device on the platen, a spring constantly urging the platen toward the type-carrying means, a lever mechanism releasably connected to the platen to move the same against action of the spring, a trip device arranged to free the platen from the lever mechanism after the platen has been moved to a predetermined extent, and means operated by the lever mechanism to effect centering of a type relative to the platen prior to operation of the trip device.

15. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device on the platen, a spring constantly urging the platen toward the type-carrying means, a lever mechanism releasably connected to the platen to move the same against action of the spring, a trip device arranged to free the platen from the lever mechanism after the platen has been moved to a predetermined extent, a spring opposed to the first-mentioned spring and arranged to cause rebounding of the platen after forcing the record sheet against the type-carrying means, and means operated by the lever mechanism to effect centering of a type relative to the platen prior to operation of the trip device.

16. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device carried by the platen and provided with means to tension the record sheet on the type-carrying means, means to operate the platen, and means operated by the platen operating means to effect centering of a type relative to the platen.

17. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device carried by the platen and provided with means to tension the record sheet on the type-carrying means, a spring constantly urging the platen toward the type-carrying means, a lever mechanism releasably connected to the platen to move the same against action of the spring, a trip device arranged to free the platen from the lever mechanism after the platen has been moved to a predetermined extent, and means operated by the lever mechanism to effect centering of a type relative to the platen prior to operation of the trip device.

18. In a machine of the kind described, the combination with a revolubly-mounted indicating drum having a spiral series of type characters on its periphery, means to shift the drum laterally as it is revolved, yieldable means resisting rotation of the drum, means to support a record sheet, manually operative means to move the sheet longitudinally and laterally before the drum, a platen movable to and from the drum whereby to force the record sheet against the type, a printing ribbon supporting device carried by the platen and provided with means to tension the record sheet on the type-carrying means, a spring constantly urging the platen toward the type-carrying means, a lever mechanism releasably connected to the platen to move the same against action of the spring, a trip device arranged to free the platen from the lever mechanism after the platen has been moved to a predetermined extent, a spring opposed to the first-mentioned spring and arranged to cause rebounding of the platen after forcing the record sheet against the type-carrying means, and means operated by the lever mechanism to effect a centering of a type relative to the platen prior to operation of the trip device.

19. In a recorder, a type wheel mounted for rotation upon its axis and having a spiral series of type characters around its periphery, and means for moving the type wheel laterally during the rotation thereof, said means being constructed to allow the type wheel to rotate a limited distance without being moved laterally.

20. In a recorder, a rotatable type carrying drum, automatic means adapted for moving the drum horizontally during the rotation thereof, the friction of operation of the said means being gradually reduced to zero prior to the cessation of rotation of the said drum.

In testimony whereof I affix my signature.

JESSE B. BAIN.